INVENTOR.

Arthur W. Lo

BY Morris A. Rabkin

ATTORNEY

Dec. 7, 1954 A. W. LO 2,696,347

MAGNETIC SWITCHING CIRCUIT

Filed June 19, 1953 2 Sheets-Sheet 2

INVENTOR.
Arthur W. Lo

BY Morris L. Rabkin

ATTORNEY 2,696,347
Patented Dec. 7, 1954

2,696,347

MAGNETIC SWITCHING CIRCUIT

Arthur W. Lo, Haddonfield, N. J., assignor to Radio Corporation of America, a corporation of Delaware Application June 19, 1953, Serial No. 362,746

12 Claims. (Cl. 235—61)

This invention refers to magnetic switching circuits for performing logical functions, and more particularly to a three-input adder circuit incorporating magnetic switches.

An adder circuit, for performing the operation of addition, is one of the basic arithmetic elements that make up a large-scale digital computer. Adder circuits generally incorporate a number of logical or switching functions, and circuits that carry out these functions frequently have separate utility. Various types of adder circuits utilizing vacuum tubes are described in the book "High-Speed Computing Devices," by Engineering Research Associates, McGraw-Hill, 1950, chapter 13. Adder circuits utilizing crystal diodes have also been devised. Recently, there have been developed adder circuits which utilize magnetic cores as the basic circuit elements. Such circuits are described by Munro K. Haynes in a thesis entitled "Magnetic Cores as Elements of Digital Computing Systems," The Graduate College, University of Illinois, 1950, pages 36–45, 50–52, and by Jan A. Rajchman in a patent application Serial No. 289,133, filed May 24, 1952, which is assigned to this assignee.

Due to the limited reliable life of electron tubes and crystals, there are attendant problems of tube and crystal failures that require replacements. With the use of magnetic cores as the basic circuit elements, the number tubes or crystals required may be substantially reduced. Magnetic-core circuits offer additional advantages in the form of reduction of size, simplicity of the circuits, and smaller power-supply requirements.

Accordingly, it is an object of this invention to provide a new and improved magnetic switching circuit.

Another object of this invention is to provide a simple magnetic switching circuit for performing logical operations.

Another object of this invention is to provide a simple magnetic adder circuit that is reliable and economical.

These and other objects of this invention are achieved in a three-input binary adder circuit made up of three magnetic cores. The magnetic cores have a substantially rectangular characteristic. A biasing coil is provided that is linked to the three cores by separate windings with different numbers of turns to bias the cores to three different states of substantial saturation. Three input coils are linked to the cores and receive the input pulses representing the addend, augend and previous carry. The input pulses to be added are each of magnitude sufficient to overcome the bias on the first core and drive it to the opposite state of saturation. The same effects are produced on the second and third cores, respectively, by input pulses on two of the inputs and by pulses on all three inputs. A sum output coil is linked to all of the cores, with windings on the first and third cores in series opposition to the winding on the second core. A carry output coil has a winding linked only to the second core. With all of the cores initially biased, certain ones of the cores are then turned over to the opposite state of saturation in accordance with the energization of the input coils. Then they are restored to their original state by the application of a large clock pulse to a restoring coil that is linked to all of the cores. If there is one input pulse, only the first core is turned over, and an output is induced in the sum output coil upon restoration. If there are two inputs, both the first and second cores are turned over. The pulses in the sum output coil are neutralized, and there is a pulse in the carry output coil. If there are three inputs, all three cores are turned over, and there is both a sum output pulse, and a carry output pulse.

The novel features of this invention, both as to its organization and mode of operation, may be more fully understood from the following description when considered together with the accompanying drawings in which.

Figure 2:
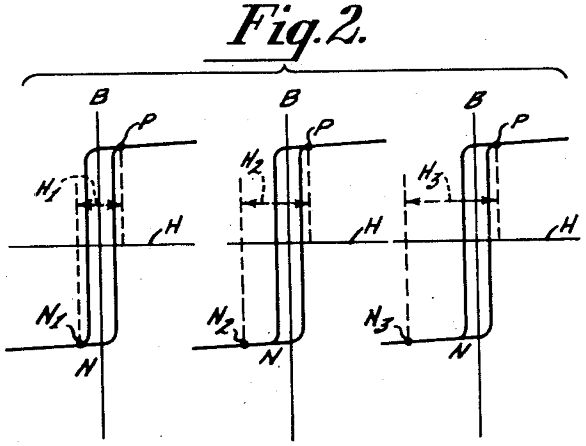
Figure 2 is a graphical diagram of the hysteresis characteristics of magnetic cores used in the circuit.
Figure 1:
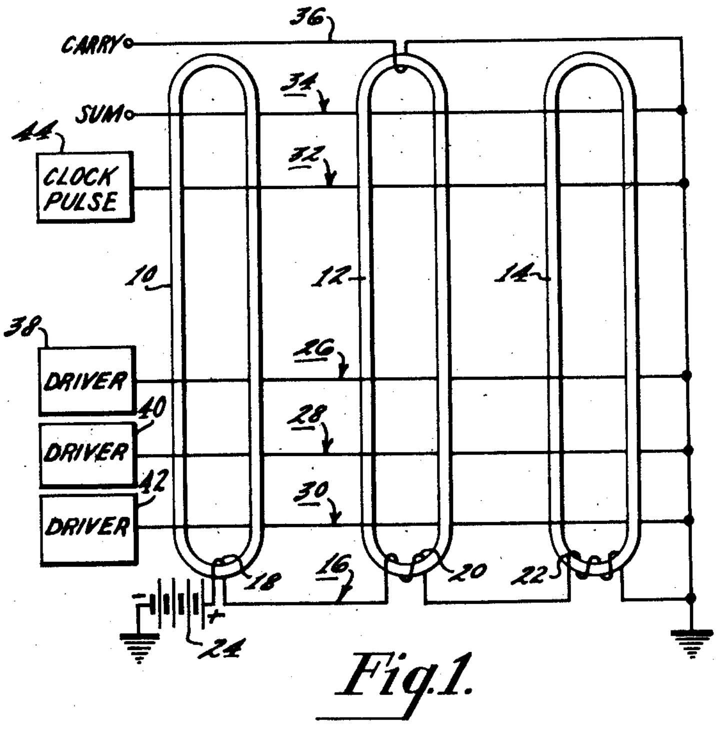
Figure 1 is a schematic circuit diagram of a magnetic three-input adder embodying this invention.

Referring now to Figure 1, there is shown a magnetic switching circuit embodying this invention which incorporates three magnetic cores 10, 12, 14. The hysteresis characteristics of the cores are generally rectangular and substantially identical, as shown in Figure 2, in which the characteristic curves are positioned above their respective cores. As a result of this type of characteristic, if a magnetic core is biased to saturation at a point $N_1$ on the curve, a magnetomotive force of $H_1$ is required to drive the core to the opposite state of saturation point P. If a magnetomotive force of less than $H_1$ is applied to the core, then the core will remain substantially in the initial state of saturation.

By means of an inhibiting coil 16 linked to the three cores 10, 12, 14, the cores are biased to three different points of substantial saturation, $N_1$, $N_2$ and $N_3$ on their respective hysteresis curves. This is done by the inhibit coil having a first winding 18 having one turn linked to the first core 10, a second winding 20 having two turns linked to the second core 12, and a third winding 22 having three turns linked to the third core 14. A direct-current bias source 24 is connected to the inhibiting coil 16. As a result of this bias, a magnetomotive force of magnitude $H_1$ is required to turn over the first core 10 to the opposite polarity; a magnetomotive force $H_2$ of magnitude equal to two times $H_1$ is required to turn over the second core 12; and a magnetomotive force $H_3$ equal to three times $H_1$ is required to turn over the third core 14. Three input coils 26, 28, 30 are provided, one 26 for the addend, the second 28 for the augend, and the third 30 for the previous-carry input. Each of the input coils 26, 28, 30 has a winding linked to each of the cores with the same sense of linkage for all of the windings and opposite to that of the inhibiting windings. The sense of winding linkage is the same as the polarity of the magnetomotive force induced in the magnetic core, and it is determined by the physical direction of coil winding and the polarity of the inducing current. A restoring coil 32 has a winding linked to each of the cores with the sense of linkage the same for each of the cores. A sum output coil 34 has a winding linked to each of the cores with the winding on the second core 12 in opposition to the windings on the first and third cores 10 and 14. A carry output coil 36 has only one winding that is linked to the second core.

Figure 3:
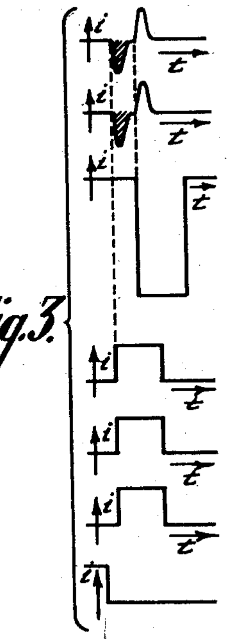
Figure 3 is a graphical diagram of waveforms occurring at various portions of the circuit.

The input coils 26, 28, 30 are pulsed by driver circuits 38, 40, 42 of any suitable form. For example, the input coils may be energized through the anode circuits of grid-controlled electron tubes (not shown). The restoring coil 32 receives a clock pulse from a suitable source 44; the amplitude of the clock pulse is three times that of the input pulses. The clock pulse is substantially delayed to start a predetermined time after the start of the input pulses. Suitable forms of a clock pulse source or generator are well known in the art. The principles of an appropriate clock pulse generator are described in the book "Calculating Instruments and Machines", by Hartree, Univ. of Ill. Press, 1949, page 103. The waveforms occurring in the different coils are shown in Figure 3. The polarities of these waveforms in Figure 3 are taken with respect to the polarities of the corresponding magnetomotive forces in the magnetic cores.

Each of the input current pulses applied to the input coils 26, 28, 30 produces a magnetomotive force of magnitude sufficient to overcome the bias on the first core 10 and drive it to the opposite state of saturation, but insufficient to change the state of saturation of the second or third cores 12 or 14. Similarly, if two input coils receive input pulses the magnetomotive forces are sufficient to overcome the bias on the second core 12 but not that of the third core 14; and if all three input coils receive pulses the magnetomotive forces are sufficient to overcome the bias on the third core 14.

The presence of an input pulse on any one of the three input coils 26, 28, 30 turns the first core 10 over from the N state to the opposite state of saturation P but does not affect the other two cores. The clock pulse that is then applied to the restoring coil 32 serves to restore the first core to its initial state N inducing a positive pulse in the sum output coil 34. The presence of input pulses on two of the three input coils turns over the first and the second cores 10 and 12 but not the third core 14. The clock pulse again restores the cores to their initial state. Since the windings of the sum output coil 34 link the first and second cores 10 and 12 in opposite directions, the pulses induced in this coil 34 neutralize each other so that no output pulse appears in the sum output coil. However, the reversal of magnetic polarity in the second core 12 induces a positive pulse in the carry output coil 36. The presence of input pulses on all three of the input coils causes a reversal of polarity in all three of the cores. When the cores are restored to their initial state, the current induced in the sum output coil 34 is made up of two positive pulses from the first and third cores and a negative pulse from the second core. Thus, there is a net positive pulse induced in the sum output coil. The change in polarity of the second core also induces a positive pulse in the carry output coil. Thus, it may be seen that the three-input binary adder unit embodying this invention carries out the following basic binary addition: With a pulse representing the binary digit one and the absence of a pulse representing the binary digit zero, the sum of one and zero is one, the sum of one and one is zero and carry one, and the sum of one and one and one is one and carry one. This binary addition is more fully described in the book cited above.

Undesirable pulses appear in the output coils when the cores are first turned over from state N to state P by the input pulses. These pulses are cross-hatched in Figure 3. However, these output pulses are of negative polarity whereas the desired output pulses are of positive polarity. Thus, the negative undesirable pulses may be easily rectified out in the output circuit. Alternatively, a gating circuit not shown may be connected to the output coils, and the positive output pulses gated out upon the arrival of the clock pulse.

The restoring coil 32 insures proper neutralization of pulses induced in the sum output coil. Without the restoring coil, the cores would be restored to their initial state of saturation N by the biasing coil 16. However, the input pulses may not be perfectly standardized and thus may terminate non-uniformly. As a result, the cores would be restored by the biasing coil at different times and cause spurious outputs. However, by means of the restoring coil and an overlapping clock pulse, the output pulses are made to start uniformly and are properly neutralized.

Figure 4:
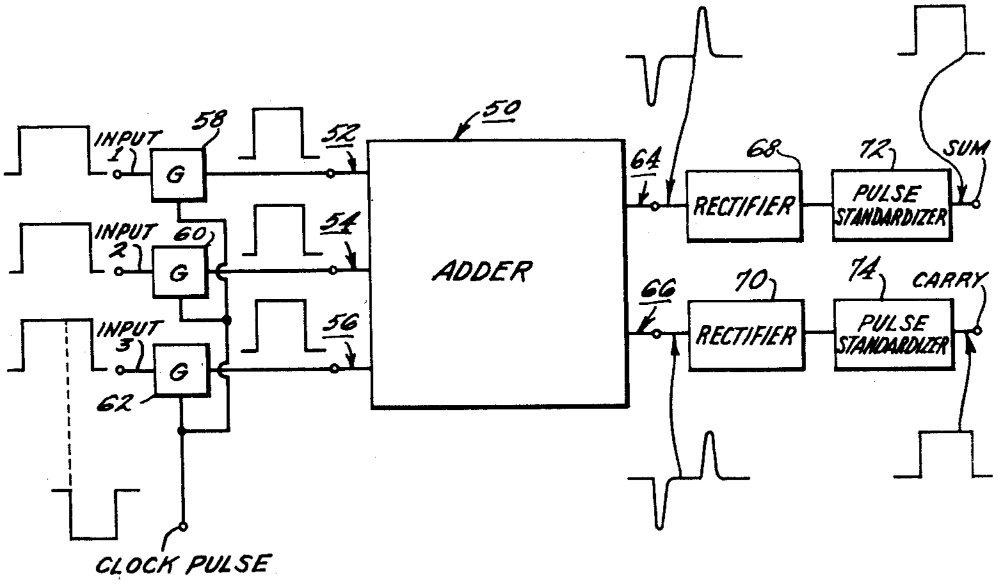
Figure 4 is a schematic block diagram of a modified embodiment of this invention.

In Figure 4, there is shown a block diagram of a three-input adder unit embodying this invention and incorporating a modification. The adder 50, shown as a block in the drawing, has the same arrangement of cores and coils as that shown in Figure 1, except that the restoring coil 32 is not used. Instead each of the three input coils 52, 54, 56 are driven by gate-driver circuits 58, 60, 62 which receive the input pulses to be added. As a second input, each of the gates receives a delayed clock pulse. The gate circuits may be any gate that produces an energizing pulse in response to an input pulse and terminates the energizing pulse when a delayed clock pulse is applied. A dual-grid electron tube (not shown) may be used. By gating the input pulses in this manner, the energizing pulses applied to the input pulses terminate uniformly. The cores are restored by the D.-C. biasing current, and the output pulses in the sum output coil 64 start coincidently and neutralize properly.

The sum output coil 64 and the carry output coil 66 are connected to rectifiers 68, 70 to eliminate the negative-going portions of the output pulses. The outputs are then applied ot pulse standardizers 72, 74 which may be univibrator circuits. These circuits produce sum and carry output pulses of standard length and amplitude. A plurality of such adder units may then be connected together with the carry output from an adder unit for one significant digit connected to the carry input of the unit for the next significant digit.

It is seen from the above description of this invention that there is provided an improved, novel magnetic switching circuit that performs the function required of a three-input adder simply, reliably and economically.

What is claimed is:

1. A magnetic switching circuit comprising a plurality of magnetic cores, a plurality of input coils each having windings linked to all of said cores, all of said input coil windings on the same cores having the same sense of linkage, separate means for applying energizing currents of the same magnitude to said input coils, means including inhibiting windings linked to said cores for applying thereto magnetomotive forces of different magnitudes such as to bias said cores to different levels of substantial saturation, the biasing magnetomotive force applied to a first one of said cores being less than that produced by the energizing current applied to one of said input coils, the biasing magnetomotive force applied to a second one of said cores being greater than that produced by the energizing current applied to one of said input coils and less than that produced by the energizing currents applied simultaneously to two of said input coils, the sense of linkage of each of said inhibiting windings being opposite to that of said input coil windings on the same core, and output means including an output coil having windings linked to all of said cores.

2. A magnetic switching circuit as recited in claim 1 wherein the windings of said output coil on said first and second ones of said cores are connected in series opposition.

3. A magnetic switching circuit as recited in claim 1 wherein the biasing magnetomotive force applied to a third one of said cores is greater than that produced by the energizing currents applied simultaneously to two of said input coils and less than that produced by the energizing currents applied simultaneously to three of said input coils.

4. A magnetic switching circuit as recited in claim 3 wherein the windings of said output coil on said second and third ones of said cores are connected in series opposition.

5. A magnetic switching circuit as recited in claim 4 wherein said output means further includes a second output coil having a winding linked to only the second one of said cores.

6. A magnetic switching circuit comprising a plurality of magnetic cores, means including inhibiting windings linked to said cores for applying thereto magnetomotive forces of different magnitudes such as to bias said cores to different levels of substantial saturation, a plurality of input coils each having windings linked to all of said cores with a sense of linkage such as to produce magnetomotive forces of polarity opposite to the polarity of the magnetomotive forces produced by the corresponding inhibiting windings, and output means including an output coil having windings linked to all of said cores and connected in opposition, add a second output coil having a winding linked to only one of said cores.

7. A magnetic switching circuit comprising a plurality of magnetic cores, means including inhibiting windings linked to said cores for applying magnetomotive forces thereto including a magnetomotive force of one magnitude to a first one of said cores, a magnetomotive force of substantially more than said one magnitude to a second one of said cores and a magnetomotive force of substantially more than twice said one magnitude to a third one of said cores, a plurality of input coils each having windings linked to said cores, the sense of linkage of said input coil windings being opposite to the sense of linkage of said inhibiting windings on the same cores, and output means including an output coil having windings linked to all of said cores.

8. A magnetic switching circuit comprising a plurality of magnetic cores, means including inhibiting windings linked to said cores for applying thereto biasing magnetomotive forces of different magnitudes, a plurality of input coils each having windings linked to said cores, the sense of linkage of said input windings being opposite to the sense of linkage of said inhibiting windings on the same cores, separate means for applying energizing currents to said input coils, output means including an output coil having windings linked to said cores, and means for initiating restoration of said cores to the magnetic state determined by said biasing magnetomotive forces a predetermined time after the application of said energizing currents to said input coils.

9. A magnetic switching circuit as recited in claim 3 wherein said means for initiating restoration of said cores includes a restoring coil having windings linked to all of said cores, the sense of linkage of the windings of said restoring coil being opposite to that of said input coil windings on the same core.

10. A magnetic switching circuit as recited in claim 3 wherein said means for initiating restoration of said cores includes means controlling the application of signals to said input coils.

11. A magnetic switching circuit comprising a first, second and third magnetic core, an inhibiting coil having a different winding linking each of said cores, each of said windings having a different number of turns with the number of turns increasing with the ordinal number of said cores, a first, second and third input coil each having windings linked to said cores, a first output coil having windings linked to said cores with an output coil winding on said second core connected in opposition to the others, a second output coil having a winding linked to said second core, and a restoring coil having windings linked to said cores.

12. A magnetic switching circuit comprising a plurality of magnetic elements, a plurality of input coils each having windings linked to all of said elements, all of said input coil windings on the same elements having a sense of linkage such as to produce magnetomotive forces of the same polarity, separate means for applying energizing currents of substantially the same magnitude to said input coils, means including inhibiting windings linked to said elements for applying thereto magnetomotive forces of the same polarity and of different magnitudes such as to bias said elements to different levels of substantial saturation, the biasing magnetomotive force applied to a first one of said elements being less than that produced by the energizing current applied to one of said input coils, the biasing magnetomotive force applied to a second one of said elements being greater than that produced by the energizing currents applied to one of said input coils and less than that produced by the energizing currents applied simultaneously to two of said input coils, the polarity of said biasing magnetomotive forces being opposite to the polarity of the magnetomotive forces produced by said energizing currents, and output means including an output coil having windings linked to said first and second elements and connected in series opposition.

References Cited in the file of this patent

UNITED STATES PATENTS

| Number | Name | Date |
|---|---|---|
| 2,021,099 | Fitzgerald | Nov. 12, 1935 |

FOREIGN PATENTS

| Number | Country | Date |
|---|---|---|
| 389,524 | Great Britain | Mar. 20, 1933 |

OTHER REFERENCES

Magnetic Binaries in the Logical Design of Information Handling Machines, N. B. Saunders, Proceedings of the Association for Computing Machinery, May 2 and 3, 1952, pages 223–229 only.